Patented Mar. 18, 1952

2,589,286

UNITED STATES PATENT OFFICE 2,589,286

PRODUCTION OF DIMENSIONALLY STABLE HARDENED COPOLYMER MONOHYDRIC PHENOL, DIHYDRIC PHENOL-ALDEHYDE RESINOUS MASS

Philip H. Rhodes, Kingston, N. Y., assignor, by mesne assignments, to Koppers Company, Inc., a corporation of Delaware No Drawing. Application August 15, 1946, Serial No. 690,824

15 Claims. (Cl. 260—54)

The present invention relates to the manufacture and utilization of reactive phenolic resin syrups.

In one form of the invention a transparent set-up phenolic type resinous mass containing up to 35% of water is prepared by forming a water-containing syrup having present a permanently fusible two-stage phenolic-aldehyde condensation product, the phenolic body of which contains at least 20% of a dihydric or dihydroxy phenol taken on a molar basis, a formaldehyde-liberating setting agent in an amount to set and harden the syrup, and a catalyst selected from the group consisting of acid and alkaline catalysts. The so-formed syrup is then set at a temperature varying between about 60° F. and 210° F., and in one form of the invention, between 60° F. and 120° F. within a time period of twelve (12) to forty-eight (48) hours, the water-content of the syrup being retained during the setting and hardening step.

If desired the syrup may have added thereto a filler selected from the group consisting of organic and inorganic fillers. The filler may be an inert fibrous fabric or a plurality of fibrous sheets, which may be superimposed one on the other.

The invention is directed to the method of preparing the set-up resinous mass and the product or articles formed therefrom, said articles being dimensionally stable and free from warpage.

The primary object of the present invention is to produce a set-up phenolic type resinous mass in a relatively, simple, efficient, and economical manner, the set-up mass being characterized by dimensional stability and resistance to solvents, said set-up mass containing a water-content up to 35%.

It is an additional object of the present invention to prepare set-up resinous masses from an aqueous syrup, said set-up resinous masses containing at least a major portion of the aqueous content of the syrup, this being effected by the procedure herein set forth and by curing at temperatures below the boiling point of water and preferably between 60° F. and 120° F.

A futher object of the present invention is to prepare set-up resinous masses of the type herein set forth which, although containing a high water content, are transparent.

The present invention will be illustrated by the following examples:

*Example I*

A syrup is prepared by first producing a copolymer phenol resorcinol-formaldehyde, permanently fusible resin and thereafter converting the same into a syrup, the phenolic body of said resin being 50% phenol and 50% resorcinol.

The copolymer phenol-resorcinol-aldehyde resin is prepared as follows:

A mixture is made of the following ingredients:

|  | Grams |
|---|---|
| Phenol (12 mols) | 1128 |
| 37% formaldehyde solution | 660 |
| Oxalic acid crystals | 5 |
| Water | 50 |

The phenol is melted and poured into a suitable reaction vessel which may be a steel kettle provided with a steam jacket, a horse shoe agitator, a reflux condenser, a thermometer well, and an addition or sampling hole. To the phenol there is added, first, 660 grams of formaldehyde solution. The oxalic acid is then dissolved in 50 grams of water and while the contents of the kettle are being stirred by the agitator, the resulting oxalic acid solution is added. Steam is then admitted to the jacket and the contents of the kettle are gradually warmed to reflux state. The kettle is maintained at a gentle reflux, usually at a temperature of 95° to 98° C., until the reaction has proceeded to the point where the formaldehyde is substantially all tied up with the phenol.

Separately, 1320 grams of resorcin are dissolved in 660 grams of 37% formaldehyde solution. Solution may occur without any warming, but usually some slight warming is necessary. The warming should not be sufficient to cause any reaction between the resorcin and the formaldehyde. Usually, when warming is necessary, the temperature should not exceed 40° to 45° or 50° C. However, care must be taken to cool the formaldehyde solution of the resorcin immediately after the resorcin has dissolved in order to prevent any reaction occurring between the resorcin and the formaldehyde. The resorcin solution is advantageously cooled to between 0° and 30° C., but most satisfactorily between 0° and 10° C., and 10° and 20° C., and the solution is maintained in the cooled state until it is added to the reaction product present in the kettle. The resorcin solution may be cooled to a lower temperature than 0° C., but this is usually not necessary or desirable.

The cooled solution of resorcin and formaldehyde is added to the kettle through the reflux just rapidly enough to maintain steady reflux of the contents of the kettle, the reflux temperature usually varying from 94° to 102° C.

After all of the resorcin-formaldehyde solution has been combined with the monohydric phenol-aldehyde condensation product, the mixture is maintained under reflux conditions to insure that substantially all of the formaldehyde or other aldehyde present is substantially tied up. In other words, there should be, in the most desirable form of the method, no free formaldehyde at this stage of the condensation reaction. Usually 10 to 15 minutes are sufficient to obtain substantial elimination of all free formaldehyde.

Thereafter, the water present in the composite copolymer product is removed in any suitable manner, but preferably by vacuum distillation. The dehydration is effected preferably under a vacuum of 26 to 28 inches of mercury and a steam pressure of about 50 to 60 pounds. During the course of the dehydration step, between 1100 and 1200 grams of liquid are removed, and of this amount a small proportion, for example, 2.5% to 3.5%, is crude unreacted phenol. When the dehydration has been completed, the kettle is opened and the liquid resinous mass is poured off and allowed to solidify to a brittle resin containing less than .5% to 1.0% of water, and usually not over .75% as determined by the A. S. T. M. method. The brittle resin is transparent, pale amber in color, and is soluble in spirit solvents.

In the above example, the reaction is carried out between .68 of a mol of formaldehyde and 1 mol of phenol. The molecular ratio of the formaldehyde to the resorcin is also of the same order. In general, the molecular ratio of the formaldehyde to the monohydric phenolic body may vary from .5 to .9 of the former to 1.0 of the latter. The ratio between the formaldehyde and the resorcin may vary in a like manner. While the molecular ratios are of the same order, as above pointed out, it is within the province of the present invention to vary the molecular ratios of the component resinous materials and thereby provide a method of producing mixed resins of a predetermined melting point and having a predetermined curing range.

While the reaction in the kettle between the monohydric phenol and formaldehyde is carried out in the presence of oxalic acid as the catalyst, it is within the province of the present invention to use other catalysts in lieu of the oxalic acid. For example, any of the weak organic acids may be used, such as citric, tartaric, acetic, and the like. Any of the usual acid catalysts may be used, such as hydrochloric acid, sulphuric acid, phosphoric acid, and the like. When using an inorganic acid as a catalyst, it is preferable to use dilute solutions of the strong acids, or to use a weak inorganic acid such as boric acid.

While it is preferred to utilize as a catalyst for the polyhydroxy benzene-aldehyde reaction, that catalyst which is already in the kettle and which has been used in effecting the reaction between the monohydric phenolic body and the aldehyde, it is recognized that under some conditions it may be desirable to add additional catalysts to the kettle just prior to the addition of the polyhydroxy benzene-aldehyde solution, as for example, a solution of resorcin in formaldehyde.

In general, the amount of catalyst used in carrying out the complete reaction will vary from about .1% to 2%, taken upon the combined weight of the monohydric phenol and the dihydroxy benzene used in carrying out the invention. The percentage of catalyst is set forth by way of illustration, and as the preferred percentage. Obviously, the amount of catalyst used will vary depending upon the character of the reacting constituents and the specific manner in which the reaction is carried out.

Instead of using formaldehyde, other prior art aldehydes may be used, such as acetaldehyde, paraldehyde, propylaldehyde, the butyl aldehydes, furfuraldehyde, and the like. Instead of using a single aldehyde, a mixture of aldehydes may be used.

The resin produced from the example above set forth is composed of 50% phenol and 50% resorcin, taken on a molar basis.

Instead of dehydrating the resin to .5% to 1% of water, that is, to an anhydrous state, varying amounts of water may be left in the resin, as for example, up to 10% to 25% taken on the weight of the resin. The so prepared resin has added thereto a reaction-accelerating agent or acid catalyst which will increase the reactivity of a laminating syrup or the laminating base prepared therefrom, thus causing the resin contained in the laminating or casting syrup to cold set at a temperature varying between 60° F. and 120° F. within 48 hours and preferably within 12 hours.

The casting syrup or laminating syrup may be prepared from the following mixture:

2000 grams of the permanently fusible resin prepared as above set forth
300 grams of water
300 grams of glycerine
30 grams of oxalic acid crystals The permanently fusible resin may be dissolved in the solvent medium, and, if necessary the reaction mass may be heated to effect a substantially complete solution of the resin. This is usually best effected by refluxing the mixture at a refluxing temperature, that is, at or adjacent 100° C., for a suitable period of time which for the mixture set forth will approximate 45 minutes, and there will thereby be produced a smooth clear homogeneous solution. In the above example the amounts of water and glycerine are, respectively, 15% by weight taken on the resin. However, the amount of water and glycerine may greatly vary and still come within the spirit of the present invention.

It is desired to point out that satisfactory cold setting syrups may be prepared where the percentage of glycerine is as high as 50% taken on the weight of the resin, or instead there may be no glycerine present in the solvent medium. Likewise, there may be as much as 100% water present in the syrup base taken on the weight of the resin, or there may be no water in the base compound thereof.

The copolymer phenol resorcinol resin is what may be termed a hydrophilic resin in that it will retain a reasonably large proportion of water in its cured condition; that is, a cured resin of the type herein described may contain as high as 35% of retained water and still maintain its transparency. It may be pointed out that it is possible to cast two-stage resorcinol-aldehyde resins in the presence of a setting agent where the resin is utilized as a water solution and that this is in contradistinction to the casting of phenolic resins in that it is impossible to cast a phenolic resin which contains water in any appreciable amount. Further, it may be stated that it is not known that two-stage straight phenolic resins such as straight monohydric phenolic resins have ever been cast.

Referring to one-stage monohydric phenol-aldehyde resins as typified by the Bakelite resins, it may be stated that these resins are hydrophobic in character. Consequently during the final setting of these resins, water is thrown out, and because it is incompatible with the cured resin structure, it serves to weaken the latter.

It has been discovered that resorcinol-formaldehyde two-stage permanently fusible resins can be cast in the presence of the water since the resorcinol-aldehyde permanently fusible resin is hydrophilic in character. As a consequence, the chemical water liberated by the curing reaction, as well as the water originally present in the casting syrup does not lower the strength of the resulting cured casting.

In the above example, the glycerine performs its prior art function of an inhibitor of shrinkage and also acts as a plasticizing agent for the casting or laminated structure. Further, the presence of glycerine or its equivalent increases the hydrophilic characteristics of the resin. Instead of using glycerine other materials may be used.

The glycerine and its equivalents are characterized by the property of compatibility with the resin component of the syrup in its uncured state and the resulting resin product in its cured state. Instead of using glycerine there may be used ethylene glycol, cyclohexanol, diethylene glycol, the partial esters and ethers of ethylene glycol and diethylene glycol typified by glycol monoethyl ether, diethylene glycol, monoethyl ether and ethylene glycol monoacetate, said partial ester and ether groups being less than the total number of hydroxyl groups in the polyhydric alcohol. In general, it may be stated that there is present in the casting syrup a material which acts as an inhibitor of shrinkage of the resin in its uncured and cured state and toughens the resin in its cured state.

A further property which should be possessed by the inhibitor of shrinkage is that it should not bleed from the resin after the latter has been cured to its permanently infusible state and should not be capable of being extracted by solvent media acting on the cured resin.

Instead of using water as a solvent for the copolymer phenol formaldehyde resin, there may be used in lieu of all or part of the water other solvents such as commercial solvent alcohol, acetone, ethyl acetate, or other alcohols, ketones, esters, or other organic solvents known to dissolve phenolic aldehyde resins.

In order to make the casting or laminating syrup cold-setting, it is to be noted that there has been added to the casting syrup thirty parts of oxalic acid crystals which act as an acid catalyst to make the two-stage permanently fusible casting or laminating syrup cold-setting in the presence of a setting agent, that is, a syrup in the presence of a setting agent will set at temperatures varying between 60° F. and 120° F. within 48 hours and preferably within twelve hours. Instead of using oxalic acid there may be employed the strong mineral acids such as sulphuric, hydrochloric, sulfonic, or the strong organic acids, such as trichloroacetic, tartaric, benzene sulfonic, and the salts of these acids with weak bases, as for example, aluminum chloride, zinc chloride, ammonium sulfate, and the like. The amount of acid catalyst required to convert the two-stage copolymer permanently fusible phenol resorcinol aldehyde resin, as for example, a phenol resorcinol formaldehyde resin in the presence of a formaldehyde liberating setting agent will in general vary from about ½ of 1% to 10% taken on the weight of the resin solids, and preferably ½ of 1% to 5%.

The laminating or casting resin can be made cold-setting by adding thereto an acid catalyst as set forth, or, alternatively, the laminating or casting syrup may be made cold-setting by employing an alkaline catalyst, as for example, sodium hydroxide. The amount of alkaline catalyst required will vary from about 1% to about 10% taken on the weight of the resin solids in the laminating or casting solutions and, preferably, about 1% to 5%.

It is preferred to use an acid catalyst to produce the laminating or casting syrup of the present invention since the acid catalyzed syrup produces set up masses of lighter color and greater dimensional stability than the alkaline catalyzed syrup. By greater dimensional stability is meant that the shrinkage is less when the casting syrup is acid catalyzed.

It is desired to point out that the casting resins of the present invention have a much lower shrinkage coefficient than the straight phenolic resins such as the Bakelite resins which are cast in the cold and cured in the hot state, that is, at temperatures above 160° F. It is customary in the prior art to cure the one-stage phenolic aldehyde resins, as for example, one-stage phenol formaldehyde resins, the so-called Bakelite resins at 160° F. or above. The higher the temperature, the greater the shrinkage.

In accordance with the present invention the dihydric phenol aldehyde resins, as for example, the resorcinol-aldehyde resins or the copolymer monohydric phenol dihydric phenol-aldehyde resins are cured in the cold, that is, at temperatures varying from about 60° F. to 120° F. and sometimes from temperatures varying from about 60° F. and about 90° F. The cold casting of these two-stage permanently fusible resins in the presence of water or other solvents produces appreciably less shrinkage than occurs when the prior art straight phenolics such as Bakelite are cast at temperatures above 160° F. In short, the shrinkage of the ordinary monohydric phenol aldehyde resins such as Bakelite is around 1%, whereas, the shrinkage of resins produced by utilizing the casting syrups of the present invention vary between about .05% and about .5%.

The casting or laminating syrups of the present invention may have the toughness of the cured resinous materials greatly increased by adding thereto a toughening agent in amounts varying from about 1% to 30% and preferably 1% to 10% taken on the weight of the resin solids present in the casting syrup, said additional toughening agents being selected from the group consisting of vinyl polymers, such as polyvinyl alcohol, polyvinyl acetate, and the like, the polymeric olefin polysulphides, such as ethylene polysulphides, cellulose derivatives, such as methyl cellulose, carboxyethyl cellulose, and the like, said toughening agents and their equivalents being compatible with the casting or laminating syrup and the setting agents employed to set the laminating syrup.

When using the syrups of the present invention as laminating agents, it is preferred that the viscosity thereof vary between 6 and 20 poises. The casting syrups of the present invention preferably have a viscosity between 10 and 30 poises. The casting syrups herein set forth which are two-stage permanently fusible resorcinol-aldehyde, as for example, resorcinol formaldehyde containing syrups or copolymer monohydric dihydric phenol aldehyde resin-containing syrups, may be set by adding thereto a suitable amount of a formaldehyde-liberating setting agent, as for example, a solution of formaldehyde in ethylene glycol, commercial 37% aqueous formaldehyde, a solution of formaldehyde in commercial solvent alcohol, a solution of formaldehyde in commercial isopropyl alcohol, a solution of dimethylol urea, thermosetting liquid urea resins, a solution of polymethylol melamines, phenolic casting syrups, and trioxane.

In general, the amount of setting agent necessary to set the resin is an amount necessary to increase the molar ratio of formaldehyde to phenolic body from less than 1:1 in a permanently fusible resin to 1:1 or greater. In general, the amount of setting agent may vary from 5% or 10% to as high as 100% or 150% taken on the weight of the resin subject to the limitation that there must be at least enough to raise the ratio of the total aldehyde of the casting or laminating syrup to the total phenolic body present in the resin to at least 1:1. It is not known that excesses in setting agent greater than 25% or 30% affect the quality of the finished product. The so-prepared casting syrup containing an acid catalyst and a formaldehyde-liberating setting agent together with fillers and/or tougheners if desired may be cast by pouring the casting syrup into a mould, said mould being composed of metallic substances, glass, or glazed ceramics or metals; waxed wooden moulds, or any mould material which is a solid at room temperature, that is between 60° F. and 120° F. and which is non-adherent to the casting syrup.

The casting is allowed to remain in the mould for a period of from ½ to 48 hours and preferably ½ to 24 hours at a temperature varying between 60° F. and 120° F.

More specifically, the casting syrup of the present example was poured into an open porcelain crucible and allowed to stand at 75° F. for a period of three hours; at the end of which time it had reached a degree of cure such that it could not be penetrated by a sharp metal stylus forced manually across its surface with a pressure of approximately 10 lbs. The shrinkage from the sides of the dish was approximately 0.002 inch per inch. The sample was transparent and light red in color and was sufficiently tough so that when it was bounced on a concrete floor it did not break.

The syrup of Example I having present therein a setting agent comprising a 37% solution of formaldehyde in ethylene glycol was used to prepare laminates from a standard grade of bleached unsized laminating paper. The individual laminae were dipped into the laminating syrup and allowed to drain for about 15 minutes until the excess syrup was removed from each of the laminae. They were then assembled in superimposed relationship until 10 layers had been built up. The stack of layers was then subjected to a pressure of 2 lbs. per square inch. The assembly was allowed to stand for a period of 8 hours at the end of which time the pressure was removed, the resin having cured sufficiently to give a relatively high degree of stability to the structure. At the end of an additional 40 hours shear test specimens were cut from the panels. The average shear strength of 5 shear specimens was 415 pounds per square inch.

*Example II*

A straight two-stage permanently fusible resorcinol-formaldehyde resin was prepared as follows:

About 2500 grams of resorcinol are reacted with 500 grams of 37% formaldehyde solution in a suitable reaction vessel. Preferably, the reaction vessel comprises a steam jacketed kettle equipped with a horse-shoe agitator, a reflux condenser, and an addition valve. The formaldehyde is added to the resorcin present in the vessel and thereafter the jacket is gradually heated so that the temperature of the resorcinol formaldehyde mixture is slowly raised to 100° C. as the resorcin goes into solution, great care being taken that the mixture does not become too ebullient, and boil over. As the temperature reaches 100° C., the steam jacket is taken out of circuit and then about 750 grams of 37% formaldehyde are gradually added to the kettle. The rate of addition is governed by the temperature of the mixture. The particular mixture above set forth is not permitted to become heated to over 110° C., no boiling over occurring. As the formaldehyde is added to the partially reacted mass, heat is generated and the rate of reaction is controlled so that the heat given off is not sufficient to cause the mass to boil over. Usually the formaldehyde is added gradually in increments, the time of addition being usually about 1¼ to 1½ hours. However, this will vary with the size of the reaction mass and on large scale production, may take as long as two or three hours.

As soon as the formaldehyde is all added to the kettle the reflux temperature is maintained by the addition of heat as necessary for a period of 10 to 20 minutes to insure complete reaction of the added formaldehyde. The kettle operation is changed from one of reflux to one of distillation, and the resin in the kettle is dehydrated by distillation until the temperature reaches 140° C. to 150° C. The latter phases of the dehydration may be done under vacuum if desired. At the completion of the dehydration the resin in the kettle may be removed and cooled to form a brittle two-stage permanently fusible resorcinol formaldehyde resin.

This resin was compounded to form a casting syrup base in accordance with the following:

| | Grams |
|---|---|
| Permanently fusible resorcinol-formaldehyde resin | 2000 |
| Water | 400 |
| Ethylene glycol | 400 |
| Oxalic acid crystals | 15 |

In making the syrup base the permanently fusible resorcinol formaldehyde resin produced as above was dissolved in 400 gms. of water, and there was added thereto 400 gms. of ethylene glycol and 15 grams of oxalic acid to thereby produce a casting or laminating syrup base which in the presence of a setting agent is converted into the final laminating or casting syrup. To the syrup base prepared as above set forth there is added 780 grams of 37% commercial aqueous formaldehyde. Laminating paper similar to that set forth in Example I was dipped into the laminating syrup containing permanently fusible resin and formaldehyde and an acid catalyst, and the laminae were allowed to drain for approximately 15 minutes after which they were assembled in panel form. The assembled laminae were cured under a pressure of 2 lbs. per square inch at a temperature of 90° F. for approximately 7 hours at the end of which time the pressure was removed and the panel was allowed to age to obtain maximum cure for an additional 36 hours at the end of which time shear test specimens were cut out of the panel and tested for shear strength. The average shear values of 5 specimens was 450 lbs. per square inch.

The shear test set forth was made by cutting strips from the panel 1 inch wide, milling grooves 1 inch apart on opposite sides of said strips, said grooves having a depth of ⅔ of the thickness of the specimen. The specimens were then mounted in a Riehle shot-loading testing machine and pulled apart with tensile loading until shear failure had occurred. The shear value was calculated as the load in pounds required to shear the one square inch area under test.

A portion of the Example II syrup containing the setting agent was poured into an open porcelain crucible and allowed to stand for about two hours at 80° F. at the end of which time it had been cured to such a state that it could not be penetrated by a metal stylus pressed manually against its surface with a force of approximately 10 lbs. The article cast in the manner described was allowed to stand for an additional 36 hours, at the end of which time it was not adversely affected by immersion in alcohol, acetone, concentrated sulphuric acid or $\frac{1}{10}$ normal sodium hydroxide. The shrinkage from the sides of the porcelain mould was approximately 0.002 inch per square inch. The cast article which was transparent had a light cherry red color, and when bounced on a concrete floor did not break.

*Example III*

Preparation and utilization of a casting or laminating syrup produced from an alkaline catalyzed permanently fusible copolymer resin in which the phenolic body is 10% phenol and 90% resorcinol based on the total molar quantity of phenols in the phenolic body of the resin.

The following ingredients are mixed in the following proportions:

| | Grams |
|---|---|
| Phenol (U. S. P. crystals) | 280 |
| 37% formaldehyde | 165 |
| Sodium hydroxide | 6 |
| Water | 20 |

The phenol is melted in a reaction kettle and then formaldehyde is introduced therein followed by the addition of the sodium hydroxide which has been previously dissolved in water. Under agitation the mixture is gradually heated to reflux and maintained there until the formaldehyde is substantially completely reacted with the phenol to form a primary undehydrated phenol-aldehyde condensation product.

Separately 2970 grams of resorcin are dissolved in 1485 grams of 37% formaldehyde solution in a second reaction kettle. Heat is applied gradually to prevent any sudden exothermic reaction. After solution occurs, heating is continued until an exothermic reaction is initiated, which usually occurs at a temperature between 65° C. to 75° C. Obviously, the temperature at which the exothermic reaction will occur will depend to some extent on the character of the reacting constituents and other physical conditions thereof. At the conclusion of the exothermic reaction, the resulting hot liquid resin solution is added gradually to the phenol-formaldehyde undehydrated primary condensation product. During the addition, the contents of the reaction kettle are maintained at reflux. The latter varies usually from about 95° C. to 102° C. After the resorcin-formaldehyde primary condensation product has been added to the phenol-aldehyde condensation product present in the first reaction kettle, the contents thereof are maintained under reflux conditions for a period of time sufficient to assure the inter-condensation of the primary phenol-formaldehyde condensation product with the primary resorcinol-formaldehyde condensation product. When using the above set forth quantities of reactants, usually about 15 to 30 minutes additional refluxing is desirable. This time limit is merely illustrative and is not by way of limitation. The final refluxing period should be sufficient, as stated, to effect inter-condensation of the primary condensation products and produce a substantially homogeneous liquid resin. The completion of the inter-condensation step is usually evidenced by the substantially complete absence of any free formaldehyde.

Thereafter, the inter-condensation product is subjected to distillation for the purpose of removing the water present in the condensation products and to effect further condensation and polymerization of the initial inter-condensation product.

The distillation is continued until the resin temperature reaches approximately 140° C. to 150° C. at which point the resin is substantially dehydrated. The resin may then be removed from the kettle and cooled to form a brittle permanently fusible copolymer phenol resorcinol formaldehyde resin.

A laminating or casting syrup base was prepared from the so-produced resin by mixing therewith the following ingredients in the following proportions:

| | Grams |
|---|---|
| Copolymer phenol resorcinol formaldehyde resin | 2000 |
| Water | 300 |
| Glycerine | 300 |
| 12 N sodium hydroxide | 60 |

In preparing the laminating or casting syrup base the resin was dissolved as in Example I, and then the 12 N sodium hydroxide was added. Thereafter to the syrup base there was added 780 grams of commercial 37% aqueous formaldehyde. The paper laminae were dipped and allowed to drain for approximately 10 minutes, and, thereafter, the panel of approximately 10 plies was assembled and approximately a pressure of 2 lbs. per sq. in. applied. At the end of 9 hours the pressure was removed. Thereafter the assembled laminae were allowed to age for a period of 36 hours in order for the maximum set to be obtained. Then the shear specimens were cut and the average shear value of the five specimens was found to be 450 lbs. per sq. in. tested as set forth in Example II.

A casting was made from the syrup containing the setting agent. The casting procedure was identical with that set forth in Example II. The casting was cured at a temperature of about 80° F. for a period of two hours. This specimen had set or cured so that it couldn't be penetrated by a metal stylus pressed against the surface of the casting with a force of 10 lbs. per sq. in., and the cast object could be removed from the mould. In order for the cast object to become fully cured as evidenced by its resistance to solvents the cast object was allowed to age after removal from the mould for a period of 36 hours at a temperature of 80° F. If it is desired to obtain a full cure in a shorter period of time, that is, have the object attain its maximum set within a shorter period of time, as for example, 12 hours, the amount of alkaline catalyst employed should be increased. In other words the time of initial and final set may be varied between 12 and 48 hours by varying the amount of acid or alkaline catalyst. It is desired to point out that the quicker the time for full cure the shorter the working life of the casting or laminating syrup.

In Examples I to III the setting agents were solutions of formaldehyde. It is possible to use other formaldehyde-liberating setting agents, as for example, trioxane, which in the presence of an acid material serves to depolymerize trioxane, thereby liberating formaldehyde which functions as the reactive setting agent. A casting syrup base was prepared using a permanently fusible resorcinol-formaldehyde resin prepared as in Example II. The casting syrup base was compounded as follows:

*Example IV*

|  | Grams |
| --- | --- |
| Resin | 200 |
| Water | 30 |
| Glycerine | 30 |
| Trioxane | 36 |

The resin was dissolved with slight heating in a mixture of water and glycerine, and the trioxane in molten form was added to the warm resin solution which may be maintained at a temperature of about 70° C. The resulting solution formed a casting or laminating syrup base. There was then added thereto 20 gms. of a 50% solution of benzene sulfonic acid in ethylene glycol. The syrup was then poured into a porcelain casting mould and allowed to stand at 100° F. for 8 hours at the end of which time it had cured to a hard casting which could not be penetrated by a metal stylus pressed manually against its surface with a force of approximately 10 lbs. To impart solid resistance to the casting after removal of the casting from the mould it was aged for a period of 36 hours. The resulting casting was characterized by a dark transparent ruby-red color and could be bounced on the floor without cracking or breaking.

While it has been pointed out that in carrying out the present invention it is desirable to set and harden the resin syrup at a temperature varying between 60° F. and 120° F. and within a time period of 12 to 48 hours, it is within the province of the invention in one of its forms to set and harden the resin syrup at a temperature varying between 60° F. and that temperature at which the water content of the resinous syrup is retained during the setting and hardening step, the upper limit thereof being about the boiling temperature of water.

One of the fundamental points of the present invention is that the water-containing syrup having present a permanently fusible two-stage phenolic-aldehyde condensation product the phenolic body of which contains at least 20% of a dihydric phenol taken on a molar basis sets in the presence of a formaldehyde-liberating setting agent and a catalyst at temperatures up to the boiling point of the water while retaining the water content of the syrup in the finished article, this being in contradistinction to the phenolic resins in the prior art which because of their hydrophobic nature release their water during the setting and hardening step or during the curing operation, thereby forming weak discontinuous articles or masses accompanied by a complete loss of transparency.

It has been discovered that in order that the mass resulting from the hardening and setting of the herein described resinous syrup contain up to a maximum of 35% water, that is, that the water in the syrup be retained during the curing operation, that the permanently fusible two-stage phenolic-aldehyde condensation product must contain at least 20% of its total phenolic body taken on a molar basis as a dihydric phenol or dihydroxy benzene, as for example, resorcinol.

While 12 to 48 hours are needed to set and harden the resinous syrup at room temperature, that is, at temperatures varying between 60° F. and 120° F., as the temperature is increased to 140° F. to 160° F. or 180° F. or to temperatures below the boiling point of water, the time to set and/or harden or cure will decrease as the temperature increases, and at temperatures between 180° F. to 210° F. cures may be obtained in as little as 5 minutes.

It has been discovered that when the amount of water present in the cured article substantially exceeds 35% the article loses its transparency and develops a tendency toward shrinkage and cracking upon ageing. In other words, the amount of water present in the syrup, whether it be from the solution of the resin, the setting agent, the catalyst, or formed during reaction, should not exceed 35% of the weight of the mass produced from curing the syrup, the lower water limit of the syrup being usually about 10%.

Instead of using resorcinol as the dihydric phenol, other dihydroxy phenols may be used having three substituted benzene ring positions and which will react with the aldehydes to produce permanently fusible resins which will become low temperature reactive with the setting agents herein set forth and at the temperatures herein set forth.

Examples of other dihydric phenolic compounds are orcin (1)CH₃C₆H₃(3,5) (OH)₂, 1 chloro 3,5 dihydroxy benzene, 1 amino 3,5 dihydroxy benzene, 1 nitro 3,5 dihydroxy benzene.

The monohydric phenol used to produce the resin may be phenol per se, the cresols, xylenols, commercial cresylic acid, and the like.

As the example of a trihydroxy phenol which may be used in carrying out the present invention, mention is made of phloroglucinol. Instead of using formaldehyde as the resin-forming aldehyde for the monohydric phenol or the dihydric phenol, other resin-forming prior art aldehydes may be used such as acetaldehyde, propylaldehyde, butylaldehyde, furfuraldehyde, and the like. Dialdehydes may also be used such as glyoxal. Instead of using a single aldehyde a mixture of aldehydes may be used.

The novel syrup herein set forth may be used as a bonding medium to unit laminae of various sheet materials, as for example, paper textiles, glass fabric, mineral fabrics, including asbestos, felt sheet stock, such as glass felt, and sisal felts or bats.

In producing the set up phenolic type resinous mass of the present invention any of the prior art fillers may be used, including walnut shell, African nut shell flour, powdered slate, barytes, iron oxides, carbon black, plaster of Paris, Portland cement, bentonite, cellite, nylon, and the like. The above fillers are examples of organic and inorganic fillers. These fillers may be present in the mass in an amount varying from 0% to 50% and, in some cases, 10% to 50% taken on the weight of the filled resin syrup.

While sodium hydroxide has been set forth as a suitable alkaline catalytic agent, to make the resin syrup cold-set, other alkaline catalysts such as potassium, hydroxide, barium hydroxide, lithium hydroxide, ammonium hydroxide, and organic bases, such as triethanol amine, ethylenediamine, and the like, may be used. Other alkaline catalysts which may be used are the alkaline salts, as for example, sodium, potassium, or lithium carbonates, tribasic sodium phosphate, borax, and the like.

As herein pointed out the syrup of the present invention may be cured in less than an hour or several hours or in less than twelve hours at temperatures varying between 60° F. and 120° F. by the use of the catalyst herein referred to.

In accordance with the present invention a high water-content which may be diluted to some extent with solvents may be incorporated in the laminated syrup containing the setting agent, and when the syrup is cured the water will be retained in the cured syrup, thus greatly lowering the shrinkage during the shrinking operation and insuring dimensional stability in the cured cast article or in the cured superimposed laminates. In other words, the set-up resinous mass of the present invention is very compatible with water.

The syrups of the present invention may be on the acid side or the alkaline side depending upon the kind of filler or laminate which is used in one form of the invention. If the fabric is of a cellulosic nature such as cotton cloth, it is desirable to use a slightly alkaline laminating syrup in order to obviate acid damage to the cellulose. On the other hand, a fabric such as nylon is somewhat more effectively bonded by an acidic laminating syrup than by an alkaline one. The syrup of the present invention does not exhibit the highly corrosive acidity characteristics of the phenol-formaldehyde resins.

The term "filler medium" as used in the claims denotes that the filler is the medium or, stated differently, it means a filler medium.

This application is a continuation-in-part of application Ser. No. 614,096 filed September 1, 1945, now U. S. Patent No. 2,524,079.

I claim:

1. A continuous dimensionally stable set-up and hardened copolymerized monohydric phenol, dihydric phenol-aldehyde resinous mass the resin component thereof being transparent and consisting of the reaction product of a water-containing syrup containing a syrup base having present a permanently fusible two-stage reaction product of a phenolic body consisting of a monohydric phenol and a dihydric phenol, and an aldehyde which is condensable with and heat-reactive with said phenolic body to form a resinous condensation product therewith, said phenolic body containing at least 10% of a monohydric phenol and at least 20% of a dihydric phenol in which the hydroxy groups are on the same carbon ring, the percentages being on a molar basis, said syrup having a viscosity varying between 6 and 30 poises; a reaction-accelerating catalyst and a formaldehyde-liberating setting agent in an amount to set and harden the resin component of the syrup, said set-up and hardened resinous mass being compatible with water and retaining between 10 and 35% of water functioning to inhibit shrinkage during the setting up and hardening of the resulting resinous reaction product, said hardened resinous mass being resistant to cracking on aging.

2. A dimensionally stable cast and hardened resinous mass, the resin component of which is a transparent copolymer monohydric phenol, dihydric phenol-aldehyde condensation product, said resin component consisting of the reaction product of a water-containing syrup containing a syrup base having present a permanently fusible two step reaction product of a phenolic body consisting of a monohydric phenol, and a dihydric phenol and an aldehyde which is condensible with and heat-reactive with said phenolic body to form a resin condensation product therewith, said phenolic body containing at least 10% of a monohydric phenol and at least 20% of a dihydric phenol in which the hydroxy groups are on the same carbon ring, the percentages being on a molar basis; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting-up and hardening of the cast resinous reaction product, the latter being resistant to cracking on aging.

3. A dimensionally stable cast and hardened resinous mass, the resin component of which is a transparent copolymer monohydric phenol, dihydric phenol-aldehyde condensation product, said resin component consisting of the reaction product of a water-containing syrup containing a syrup base having present a permanently fusible two step reaction product of a phenolic body consisting of a monohydric phenol, and a dihydric phenol and formaldehyde condensible with said phenolic body to form a resin condensation product therewith, said phenolic body containing at least 10% of a monohydric phenol and at least 20% of a dihydric phenol in which the hydroxy groups are on the same carbon ring, the percentages being on a molar basis; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting-up and hardening of the cast resinous reaction product, the latter being resistant to cracking on aging.

4. A dimensionally stable cast and hardened resinous mass, the resin component of which is a transparent copolymer monohydric phenol dihydric phenol-aldehyde condensation product, said resin component consisting of the reaction product of a water-containing syrup containing a syrup base having present a permanently fusible two step reaction product of a phenolic body containing at least 50% taken on a molar basis of a monohydric phenol and at least 20% taken on a molar basis of a dihydric phenol in which the hydroxy groups are on the same carbon ring, and an aldehyde which is condensible with and heat-reactive with said phenolic body to form a resin condensation product therewith; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting-up and hardening of the cast resinous reaction product, the latter being resistant to cracking on aging.

5. A dimensionally stable cast and hardened resinous mass, the resin component of which is a transparent copolymer monohydric phenol dihydric phenol-aldehyde condensation product, said resin component consisting of the reaction product of a water-containing syrup containing a syrup base having present a permanently fusible two step reaction product of a phenolic body containing at least 50% taken on a molar basis of a monohydric phenol and at least 20% taken on a molar basis of a dihydric phenol in which the hydroxy groups are on the same carbon ring, and formaldehyde condensible with said phenolic body to form a resin condensation product therewith; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting-up and hardening of the cast resinous reaction product, the latter being resistant to cracking on aging.

6. A dimensionally stable cast and hardened resinous mass, the resin component of which is a transparent copolymer monohydric phenol dihydric phenol-aldehyde condensation product, said resin component consisting of the reaction product of a water-containing syrup containing a syrup base having present a permanently fusible two step reaction product of a phenolic body containing 50% of a monohydric phenol and 50% of a dihydric phenol in which the hydroxy groups are on the same carbon ring, the percentage of both phenols being taken on a molar basis, and an aldehyde which is condensible with and heat-reactive with said phenolic body to form a resin condensation product therewith; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting up and hardening of the cast resinous reaction product, the latter being resistent to cracking on aging.

7. A dimensionally stable cast and hardened resinous mass, the resin component of which is a transparent copolymer monohydric phenol dihydric phenol-aldehyde condensation product, said resin component consisting of the reaction product of a water-containing syrup containing a syrup base having present a permanently fusible two step reaction product of a phenolic body containing 50% of a monohydric phenol and 50% of a dihydric phenol in which the hydroxy groups are on the same carbon ring, the percentage of both phenols being taken on a molar basis, and formaldehyde condensible with said phenolic body to form a resin condensation product therewith; a reaction accelerating catalyst; and a formaldehyde-liberating setting agent in an amount to set and harden the syrup, the resin component of said set-up and hardened mass being compatible with and retaining between 10% and 35% of water functioning to inhibit shrinkage during the setting-up and hardening of the cast resinous reaction product, the latter being resistent to cracking on aging.

8. The cast and hardened resinous mass set forth in claim 2 in which the monohydric phenol is phenol per se and the dihydric phenol is resorcinol.

9. The cast and hardened resinous mass set forth in claim 4 in which the monohydric phenol is phenol per se and the dihydric phenol is resorcinol.

10. The cast and hardened resinous mass set forth in claim 6 in which the monohydric phenol is phenol per se and the dihydric phenol is resorcinol.

11. The cast and hardened resinous mass set forth in claim 5 in which the monohydric phenol is phenol per se and the dihydric phenol is resorcinol.

12. The stable and hardened resinous mass set forth in claim 1 in which the original phenol body which reacts with the aldehyde contains at least 50% of a monohydric phenol and at least 20% of a dihydric phenol in which the hydroxy groups are on the same carbon ring, said percentages being taken on a molar basis.

13. The stable and hardened resinous mass set forth in claim 1 in which the monohydric phenol is phenol per se and the dihydric phenol is resorcinol.

14. The stable and hardened resinous mass set forth in claim 1 in which the original phenol body which reacts with the aldehyde contains at least 50% of a monohydric phenol and at least 20% of a dihydric phenol in which the hydroxy groups are on the same carbon ring, said percentages being taken on a molar basis, the monohydric phenol being phenol per se and the dihydric phenol being resorcinol.

15. The stable and hardened resinous mass set forth in claim 1 in which the original phenol body which reacts with the aldehyde contains 50% of a monohydric phenol and 50% of a dihydric phenol in which the hydroxy groups are on the same carbon ring, the percentages of both phenols being taken on a molar basis, the monohydric phenol being phenol per se and the dihydric phenol being resorcinol.

PHILIP H. RHODES.

REFERENCES CITED

The following references are of record in the file of this patent:

UNITED STATES PATENTS

| Number | Name | Date |
| --- | --- | --- |
| 1,849,109 | Novotny | Mar. 15, 1932 |
| 2,385,370 | Norton | Sept. 25, 1945 |
| 2,385,372 | Rhodes | Sept. 25, 1945 |
| 2,385,373 | Rhodes | Sept. 25, 1945 |
| 2,385,374 | Rhodes | Sept. 25, 1945 |
| 2,398,361 | Daniels | Apr. 16, 1946 |
| 2,398,388 | Norton | Apr. 16, 1946 |
| 2,414,415 | Rhodes | Jan. 14, 1947 |
| 2,478,943 | Rhodes | Aug. 16, 1949 |

FOREIGN PATENTS

| Number | Country | Date |
| --- | --- | --- |
| 559,590 | Great Britain | Feb. 25, 1944 |